US008990248B1

(12) United States Patent
Baugh et al.

(10) Patent No.: US 8,990,248 B1
(45) Date of Patent: Mar. 24, 2015

(54) PEER-TO-PEER NETWORK IMAGE DISTRIBUTION HIERARCHY

(75) Inventors: Richard Baugh, Plano, TX (US); Todd Lindstrom, McKinney, TX (US)

(73) Assignee: Cisco Technology, Inc., San Jose, CA (US)

( * ) Notice: Subject to any disclaimer, the term of this patent is extended or adjusted under 35 U.S.C. 154(b) by 1354 days.

(21) Appl. No.: 11/639,051

(22) Filed: Dec. 13, 2006

(51) Int. Cl.
G06F 7/00 (2006.01)
G06F 17/30 (2006.01)

(52) U.S. Cl.
USPC ........... 707/781; 707/610; 707/623; 707/758; 707/999.01

(58) Field of Classification Search
CPC .............. G06F 17/30073; G06F 17/30221; G06F 17/30067; G06F 17/30575
See application file for complete search history.

(56) References Cited

U.S. PATENT DOCUMENTS

| 5,546,539 | A | * | 8/1996 | Poling | 707/201 |
| 2002/0147784 | A1 | * | 10/2002 | Gold et al. | 709/208 |
| 2005/0088980 | A1 | * | 4/2005 | Olkkonen et al. | 370/255 |
| 2006/0044407 | A1 | * | 3/2006 | Barbeau | 348/211.3 |

OTHER PUBLICATIONS

"BitTorrent" downloaded from the Internet: http://en.wikipedia.org/wiki/BitTorrent Wikipedia. Dec. 6, 2006, 15 pages.
"eDonkey network" downloaded from the Internet: http://en.wikipedia.org/wiki/Edonkey_network Wikipedia. Dec. 6, 2006, 4 pages.
"eDonkey2000" downloaded from the Internet: http://en.wikipedia.org/wiki/Edonkey2000 Wikipedia. Dec. 6, 2006, 3 pages.
"Gnutella" downloaded from the Internet: http://en.wikipedia.org/wiki/Gnutella Wikipedia. Dec. 6, 2006, 5 pages.
"Kazaa" downloaded from the Internet: http://en.wikipedia.org/wiki/Kazaa Wikipedia. Dec. 6, 2006, 5 pages.
"FastTrack (protocol)" downloaded from the Internet: http://en.wikipedia.org/wiki/Fasttrack Wikipedia. Dec. 6, 2006, 2 pages.

* cited by examiner

Primary Examiner — Azam Cheema
(74) Attorney, Agent, or Firm — Novak Druce Connolly Bove + Quigg LLP

(57) ABSTRACT

In one embodiment, network devices such as IP phones may be upgraded with a set of files. A master network device in the set of network devices is identified. The master network device retrieves or receives one or more files in the set of files. The master network device then distributes the file(s) to one or more network devices in the set of network devices, thereby enabling the file(s) to be distributed in a hierarchical manner to remaining network devices in the set of network devices.

33 Claims, 8 Drawing Sheets

PEER-TO-PEER NETWORK IMAGE DISTRIBUTION HIERARCHY

BACKGROUND

1. Technical Field

The present disclosure relates generally to methods and apparatus for distributing files to a set of network devices.

2. Description of the Related Art

A phone that is capable of sending traffic over an IP network is typically referred to as an IP phone. Multiple IP phones are typically connected to one another via one or more networks. In order to upgrade the IP phones, a set of files is often stored at a file server. When the IP phones are notified of the upgrade, the IP phones attempt to retrieve the set of files stored at the file server. Unfortunately, the IP phones will all attempt to retrieve the set of files from the file server simultaneously, which in some situations can cause network congestion and upgrade delays.

Many of the IP phones being upgraded may be connected to the call management server via high bandwidth connections. However, a number of the IP phones that are not local to the file server may be connected to the file server via low bandwidth connections. For instance, customer phones that are deployed in branch locations may have a low bandwidth connection to the file server. These customer phones often experience a substantial upgrade time, as well as unreliable upgrade results.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In accordance with one embodiment, in order to upgrade a set of network devices with a set of files, a network device in the set of network devices identifies itself as the master network device. The master network device retrieves or receives one or more files in the set of files and distributes the file(s) to one or more network devices in the set of network devices, thereby enabling the file(s) to be distributed in a hierarchical manner to remaining network devices in the set of network devices.

In accordance with another embodiment, a non-master network device receives one or more files in the set of files. The non-master network ascertains whether it has one or more child nodes, wherein each of the child nodes is a network device in the set of network devices. If it is ascertained that the non-master network device has one or more child nodes, the non-master network device distributes the file(s) to its child nodes, thereby enabling the file(s) to be distributed in a hierarchical manner to remaining network devices in the set of network devices via the one or more child nodes.

Specific Example Embodiments

The disclosed embodiments support the upgrading of a set of network devices in a network with a set of one or more files. This is accomplished, in part, by identifying a master network device in the set of network devices. The master network device may retrieve or receive one or more files in the set of files and distribute them to one or more network devices in the set of network devices, thereby enabling the one or more files to be distributed in a hierarchical manner to remaining network devices in the set of network devices. In accordance with one embodiment, a different master network device may be identified for purposes of distributing a different file(s) in the set of files, and therefore different master network devices may ultimately distribute the different file(s).

The network devices in the set of network devices may be the same type of network device, or they may be different types of network devices. In accordance with one embodiment, each of the network devices in the set of network devices is an IP phone.

Figure 1:
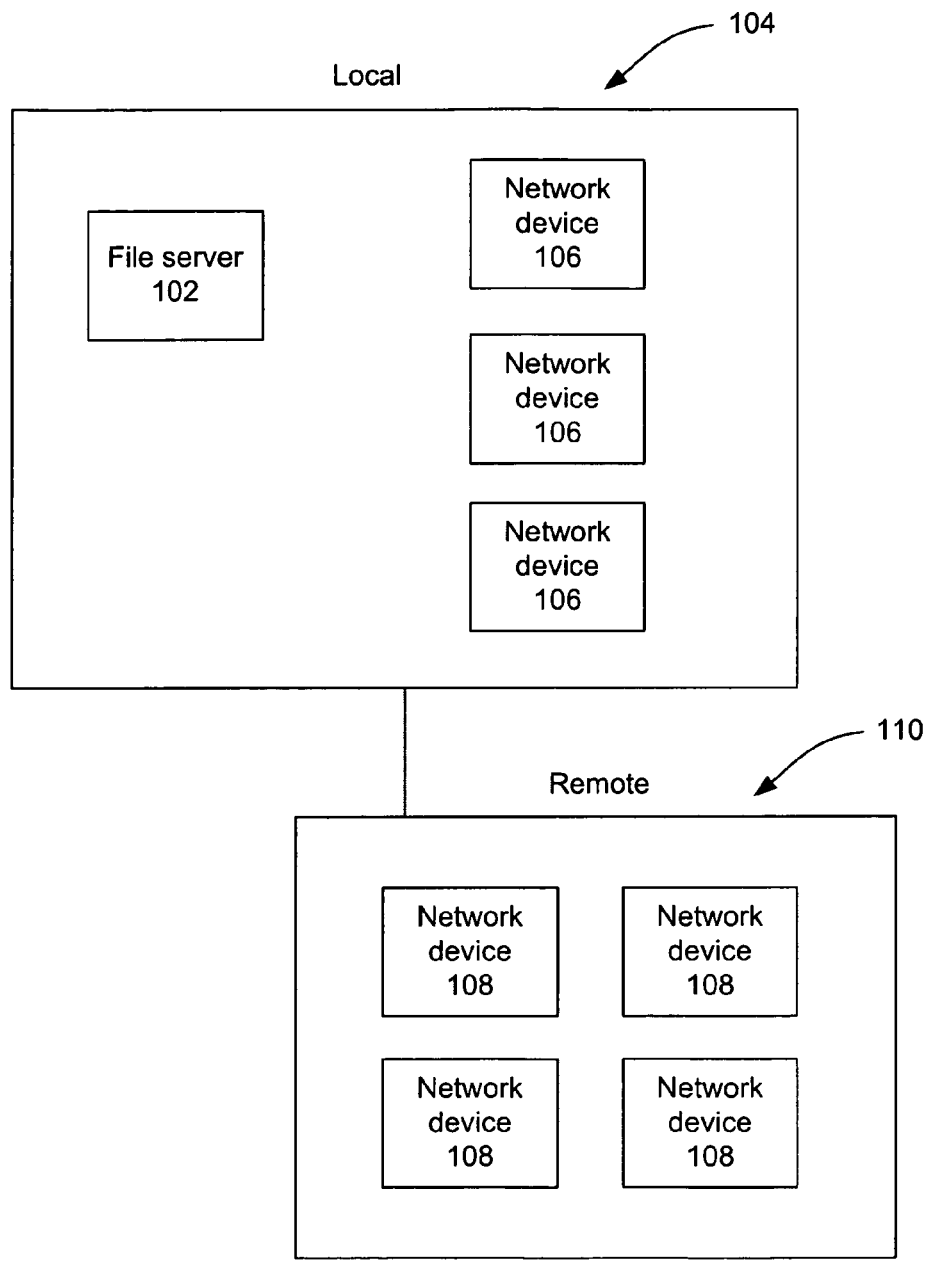
FIG. 1 is a block diagram illustrating an example of a system in which distributed file distribution may be performed.

FIG. 1 is a block diagram illustrating an example of a system in which distributed file distribution may be performed. The set of files corresponding to a particular upgrade may be stored on a file server 102, as shown. Although one file server is shown in this example, the set of files may be stored among two or more file servers. The file server 102 is implemented in a network 104, which may be referred to as a local network. For instance, the local network may be a private network associated with a company or other entity. Each network device in the set of network devices may be within the local network 104 or outside the local network (e.g., in a remote network). Thus, there are three different possibilities. The first possibility is that all of the network devices in the set of network devices are within the local network 104. The second possibility is that all of the network devices in the set of network devices are outside the local network 104. The third possibility, as shown in this example, is that the local network 104 includes one or more network devices 106, and one or more network devices 108 are within one or more remote networks 110 outside the local network 104.

Figure 2:
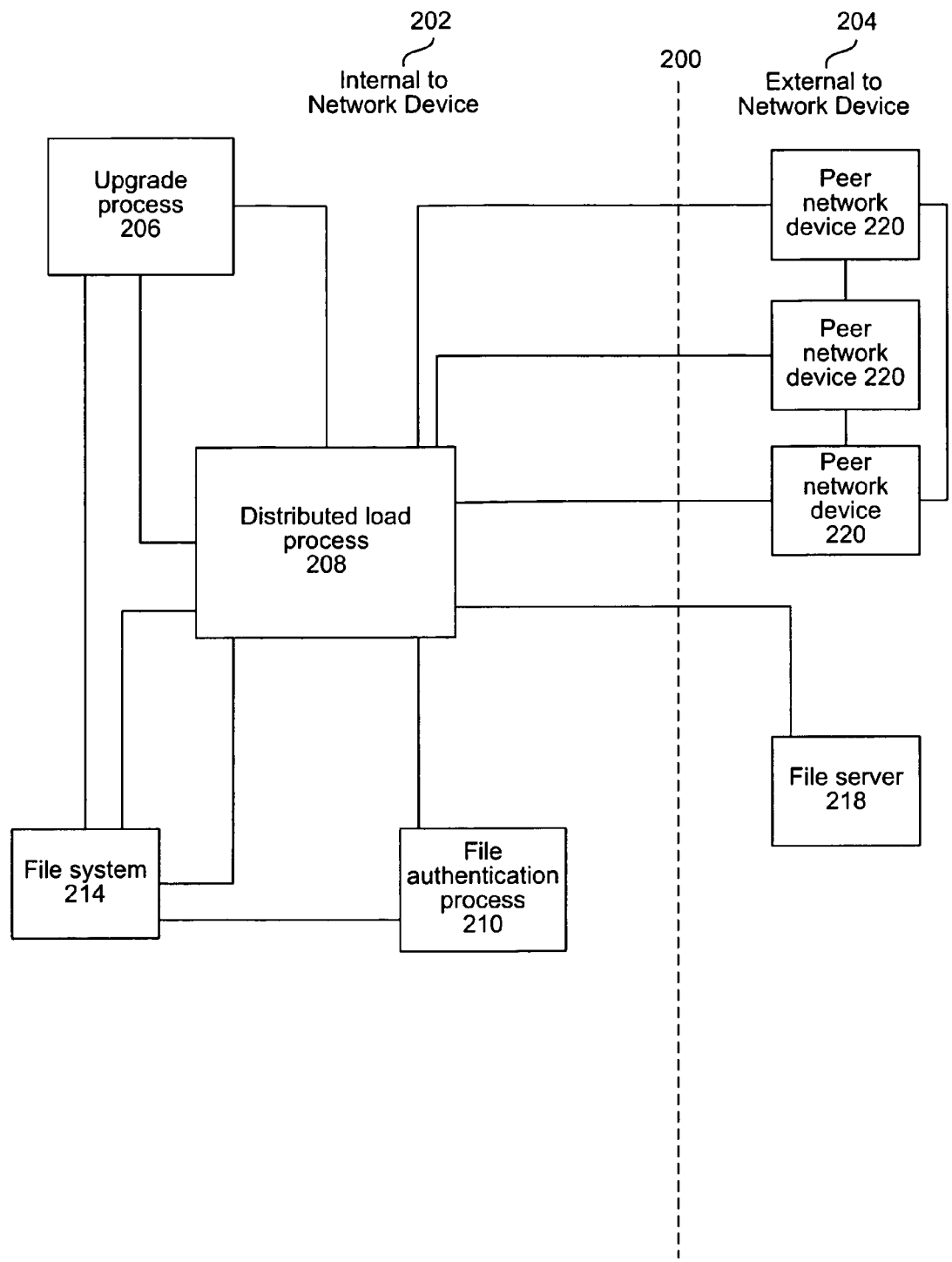
FIG. 2 is a block diagram illustrating an example of a system in which distributed file distribution may be performed to upgrade a set of IP phones.

FIG. 2 is a block diagram illustrating an example of a system in which distributed file distribution may be performed to upgrade a set of network devices such as IP phones. Operations performed within a single network device are represented to the left of vertical line 200, as shown at 202. Operations that are performed external to the network device are represented to the right of the vertical line 200, as shown at 204.

In accordance with one embodiment, the set of files associated with the upgrade may be identified in a list of one or more files. The list of files may also indicate an order in which the listed files are to be retrieved. The list of files may be stored in a separate file, which may be referred to as an index file. Each of the set of network devices may retrieve or receive the index file, enabling each of the network devices to participate in the peer-to-peer image update process using the list of files involved.

An upgrade process 206 may identify the files to be retrieved and the order in which the files are to be retrieved. The upgrade process 206 may provide the identity of the files and order in which the files are to be retrieved as parameters to a distributed load process 208. For instance, the upgrade process 206 may provide the identity of the file(s) and order in which the files are to be retrieved as an index file (i.e., LOADS file) to the distributed load process 208. The distributed load process 208 may authenticate the source of the list of files via a file authentication process 210. The authentication process 210 may provide a response to the upgrade process 206 indicating whether the file has been successfully authenticated.

The distributed load process 208 of a master network device may obtain the files identified in the list of files (e.g., from a file server) and provide the files to a file system 214 for storage and later processing by the upgrade process 206. More particularly, as will be described in further detail below, a master network device may retrieve a file from the file system 214 and distribute the file to its child node(s), enabling the file to be distributed in a hierarchical manner to all network devices in the set of network devices. In a non-master network device, the distributed load process 208 may receive one or more files from another network device and provide the file(s) to the file system 214 for storage, as well as subsequent processing by the upgrade process 206. For instance, a non-master network device may similarly distribute any files that have been obtained and stored in the file system 214 to its child node(s).

As will be described in further detail below, the network device may operate as a master network device or non-master network device for purposes of retrieving one or more files. If the network device determines that it is the master network device for one or more files in the set of files, it may retrieve the file(s) from the file server 218. Alternatively, if the network device is not the master network device for the next one or more files in the set of files, it may wait to receive the file(s) from the master network device for the file(s) or another non-master network device.

Once the file(s) have been obtained, the file authentication process 210 may authenticate the file(s). In addition, the distributed load process 208 may provide the file(s) to the file system 214 to be stored for later use by the upgrade process 206 so that the file(s) may be processed in such a way that the file update is completed.

In accordance with one embodiment, a hierarchy is established such that the root node is the master network device for purposes of downloading one or more files in the set of files. For instance, a set of phones may communicate among one another to establish such a hierarchy. A different hierarchy may be established for purposes of performing distributed downloading of each file such that the file is distributed in a hierarchical manner among the remaining peer network devices 220. Accordingly, the network device that acts as a master network device for purposes of initiating the distributed downloading of one file may or may not be different from the network device that acts as a master network device for purposes of initiating the distributed downloading of another file.

Once a master network device such as an IP phone receives a file from the file server 218 or a non-master network device receives a file from a peer network device 220, the master and/or non-master network device may distribute the file to the network device's child nodes. Each of the child nodes may then distribute the file to their children, etc. In accordance with one embodiment, the hierarchy may be represented by a tree structure. Since each of the nodes in the tree may have only a few child nodes, a node may be responsible for distributing a file to a limited number of nodes, depending upon the tree structure. For instance, since each node in a binary tree may have a maximum of two child nodes, each node in the binary tree may distribute a file to a maximum of two network devices.

A simplified method of performing an upgrade for a set of network devices such as IP phones will be described in further detail with reference to FIGS. 3A and 3B. More particularly, FIG. 3A describes an example process performed by a master network device, while FIG. 3B describes an example process performed by a non-master network device.

Figures 3A, 3B:
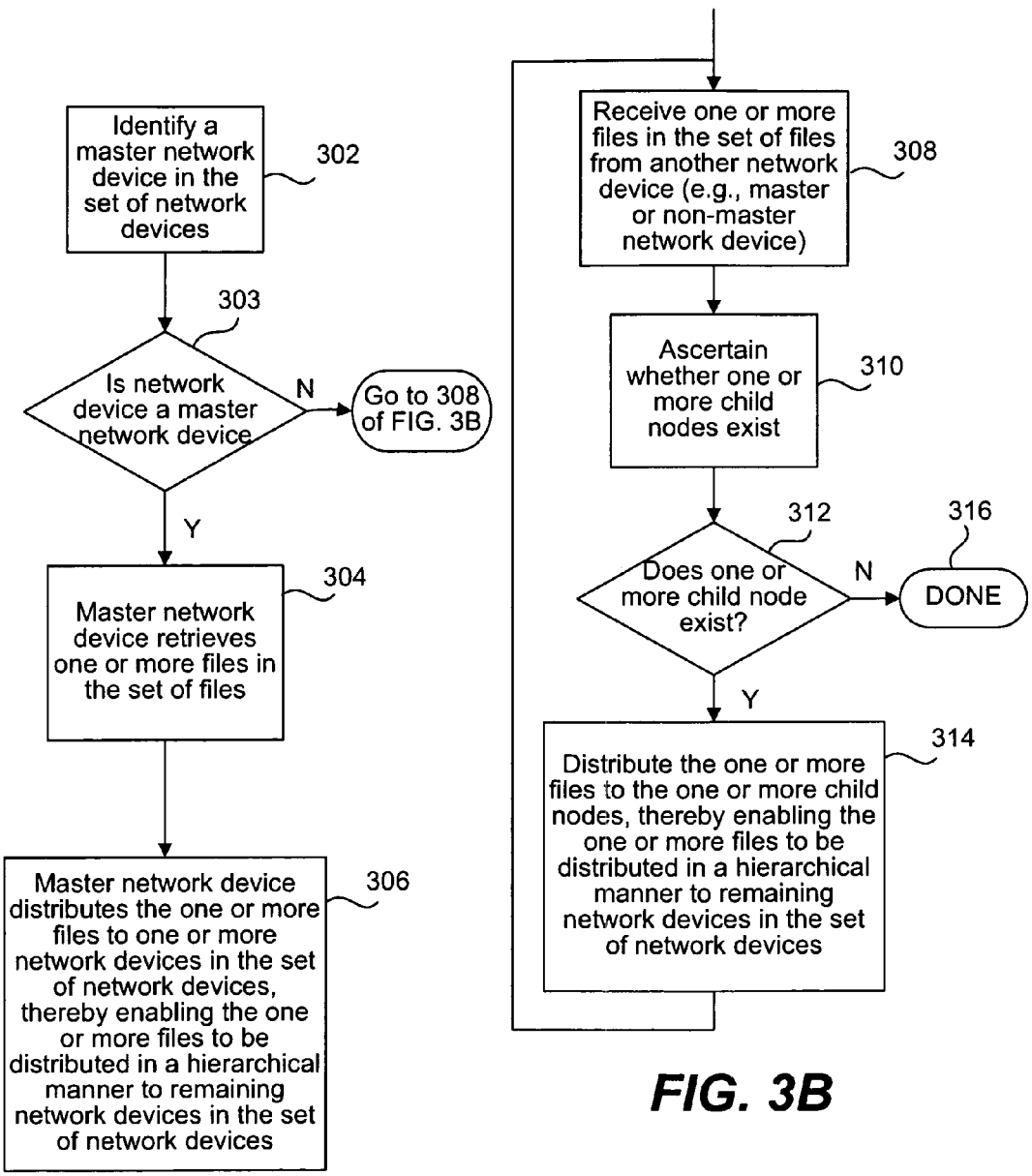
FIG. 3A is a process flow diagram illustrating an example method of performing an upgrade for a set of network devices via a master network device.
FIG. 3B is a process flow diagram illustrating an example method of performing an upgrade for a set of network devices via a non-master network device.

FIG. 3A is a process flow diagram illustrating an example method of performing an upgrade for a set of network devices via a master network device. A master network device in the set of network devices is identified at 302 such that the network device is the master network device (e.g., for purposes of distributed downloading of one or more files). For instance, the network devices may communicate with one another to ascertain the identity of the master network device. If the network device determines that it is a master network device at 303, the master network device retrieves one or more files in the set of files at 304. The master network device may then distribute the file(s) that have been retrieved to one or more network devices in the set of network devices at 306, thereby enabling the file(s) to be distributed in a hierarchical manner to remaining network devices in the set of network devices. If a network device determines that it is not a master at 303, then processing proceeds to FIG. 3B at 308.

FIG. 3B is a process flow diagram illustrating an example method of performing an upgrade for a set of network devices via a non-master network device. As shown, a non-master network device receives one or more files in the set of files from another network device (e.g., master or non-master network device) at 308. The non-master network device may determine whether it has one or more child nodes (which are each network devices in the set of network devices being upgraded) at 310. If the non-master network device has one or more child nodes at 312, the non-master network device distributes the file(s) it has received to its child node(s) at 314, thereby enabling the file(s) to be distributed in a hierarchical manner to remaining network devices in the set of network devices via the one or more child nodes. This is accomplished by repeating the process at 308 until all child nodes have received the file(s). The process may end at 316 when all of the network devices in the set of network devices have received the file(s).

The processes described above with reference to FIGS. 3A and 3B illustrate the process of distributing one or more files in the set of files. In accordance with one embodiment, the processes described in FIGS. 3A and 3B are repeated for each file in the set of files associated with the upgrade. Thus, a different network device in the set of network devices may operate as the master network device for purposes of initiating the distributed load process for each file in the set of files.

Figure 4:
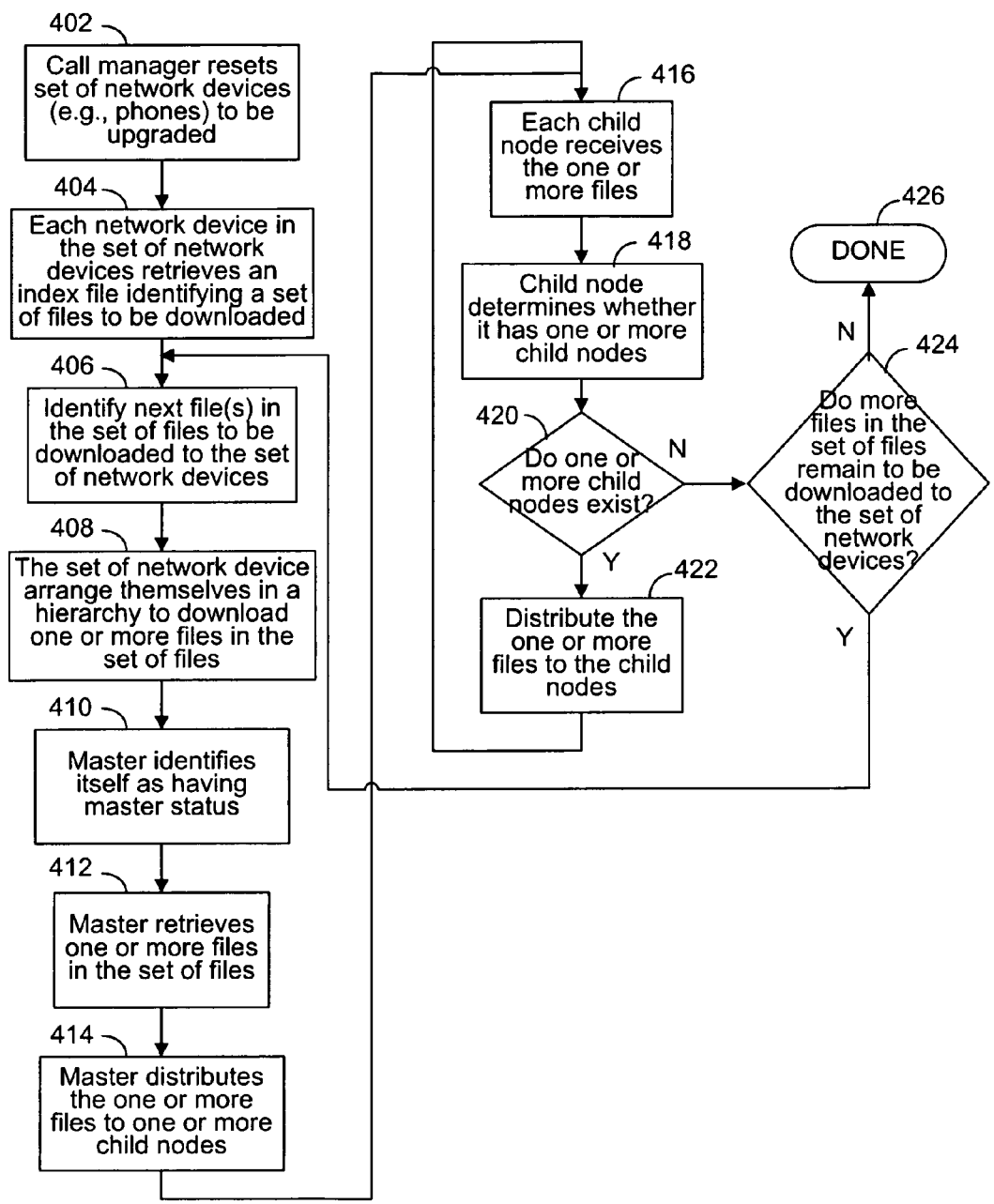
FIG. 4 is a process flow diagram illustrating an example method of performing an upgrade for a set of files via multiple master network devices.

FIG. 4 is a process flow diagram illustrating an example method of performing an upgrade for a set of files via multiple master network devices. A central network device controller such as a call manager external to the network devices (e.g., IP phones) may notify the set of network devices that they are to be upgraded at 402. This may be accomplished, for example, by sending a reset message to the network devices. Each of the network devices may then retrieve an index file identifying a set of files to be downloaded at 404, if the network device has not already received or retrieved the index file. A next one or more files in the set of files to be downloaded to the set of network devices may be identified at 406.

The set of network devices may arrange themselves in a hierarchy to download one or more files in the set of files at 408. One of the network devices may be identified as having master status at 410. For instance, the master network device may identify itself as the root node of the hierarchy.

The master network device may retrieve or receive the one or more files for which it is responsible for initiating the distributed download process at 412 (e.g., from a file server). The master network device may distribute the file(s) to one or more child nodes at 414. For instance, where the hierarchy is in the form of a binary tree, the master network device may distribute the file(s) to zero, one or two child nodes.

When a non-master network device (i.e., child node) receives the file(s) at 416, the child node may determine whether it has one or more child nodes at 418. If one or more child nodes exist at 420, the file(s) is distributed to the child node(s) at 422. The process may continue at 416 for all nodes in the hierarchy until all nodes have received the file(s).

After a network device receives a file, it may authenticate the file to ensure that it is a valid file free from transmission error or other corruption. If the file is not successfully authenticated, the download process may be terminated to avoid network device corruption. However, if the file is successfully authenticated, the download process continues as set forth below.

In addition to distributing the file(s) to all nodes in the hierarchy, the remaining file(s) in the set of files may also be downloaded in a distributed manner such as that set forth above. If there are more files that remain to be downloaded to the set of network devices at 424, the process may continue at 406 for the next file(s) in the set of files to be downloaded. Once all files in the set of files have been downloaded to each of the network devices in the set of network devices, the process ends at 426.

In order to simplify the illustration, the steps of FIG. 4 are illustrated in a serial manner. However, it is important to note that the upgrade process may also be performed in a parallel manner, enabling the file(s) to be distributed in parallel by two or more nodes. For instance, steps 406-412 performed by a master network device may be performed simultaneously with child node processing represented by steps 416-422. Moreover, multiple child nodes at the same or different levels of the hierarchy may distribute the file(s) in parallel. Similarly, processing performed by two or more master network devices associated with two or more hierarchies may also be performed in parallel. Thus, although the example set forth above with reference to FIG. 4 illustrates the distribution of one or more file(s) among a hierarchy of nodes prior to generating a new hierarchy to distribute additional files, it is important to note that multiple files may be distributed in parallel via one or more hierarchies.

Figure 5A:
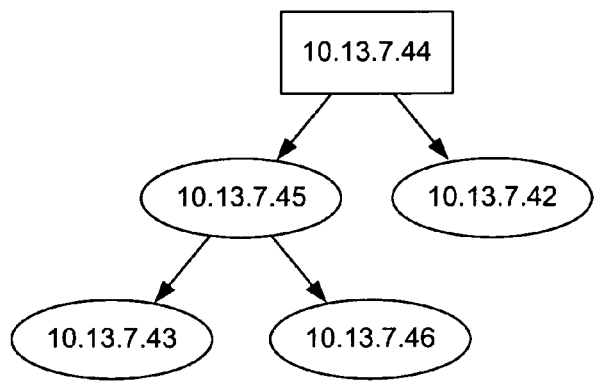
FIGS. 5A through 5C together illustrate an example of a hierarchy in which the set of network devices may arrange themselves for each file being downloaded.
Figure 5B:
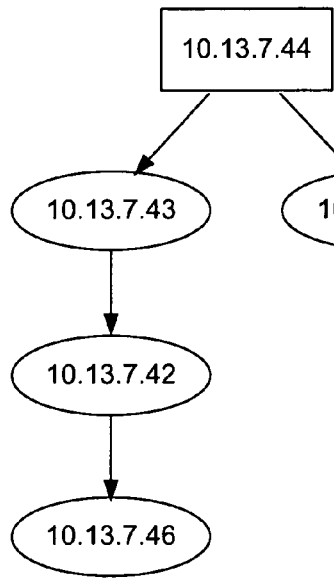
Figure 5C:
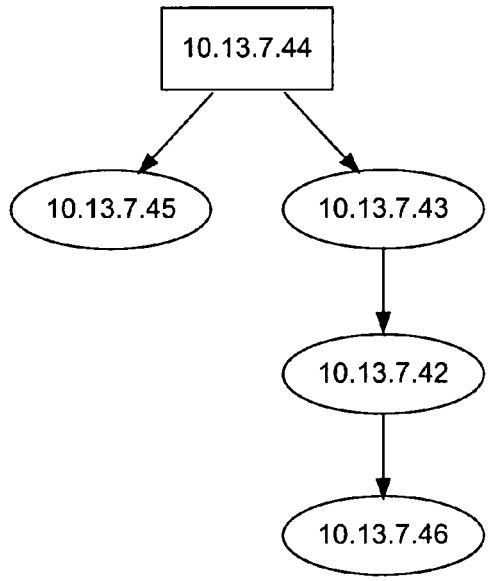

FIGS. 5A through 5C together illustrate an example of a hierarchy in which the set of network devices may arrange themselves for each file being downloaded. In this example, each of the network devices is an IP phone identified by a corresponding IP address. The five network devices in this example have IP addresses 10.13.7.42, 10.13.7.43, 10.13.7.44, 10.13.7.45, and 10.13.7.46. In this example, there are three different files to be downloaded to complete the upgrade.

In accordance with one embodiment, a new hierarchy is generated for performing distributed downloading of each file. As a result, three different hierarchies are generated. As shown in FIG. 5A, the network device having the IP address 10.13.7.44 is the master network device and root node for purposes of retrieving the first file. Once the master network device identifies (e.g., selects) its child nodes having IP addresses 10.13.7.45 and 10.13.7.42, respectively, the master network device provides the first file to both of its child nodes. The first child node having IP address 10.13.7.45 ascertains that it has two child nodes (e.g., by selecting the child nodes), and distributes the first file to its child nodes having IP addresses 10.13.7.43 and 10.13.7.46, respectively. The second child node having IP address 10.13.7.42 has no child nodes.

A second hierarchy is generated for purposes of distributing the second file, as shown in FIG. 5B. In this example, the network device having the IP address 10.13.7.44 is the master network device and root node for purposes of retrieving the second file. Once the master network device identifies (e.g., selects) its child nodes having IP addresses 10.13.7.43 and 10.13.7.45, respectively, the master network device provides the second file to both of its child nodes. The first child node having IP address 10.13.7.43 ascertains that it has one child node (e.g., by selecting the child node), and distributes the second file to its child node having IP address 10.13.7.42. The network device identified by IP address 10.13.7.42 ascertains that it has one child node (e.g., by selecting the child node), and distributes the second file to its child node having IP address 10.13.7.46. The second child node having IP address 10.13.7.45 has no child nodes.

A third hierarchy is generated for purposes of distributing the third file, as shown in FIG. 5C. In this example, the network device having the IP address 10.13.7.44 is the master network device and root node for purposes of retrieving the third file. Once the master network device identifies (e.g., selects) its child nodes having IP addresses 10.13.7.45 and 10.13.7.43, respectively, the master network device provides the third file to both of its child nodes. The first child node having IP address 10.13.7.45 has no child nodes. The second child node having IP address 10.13.7.43 ascertains that it has one child node (e.g., by selecting the child node), and distributes the third file to its child node having IP address 10.13.7.42. The network device identified by IP address 10.13.7.42 ascertains that it has one child node (e.g., by selecting the child node), and distributes the third file to its child node having IP address 10.13.7.46.

Figure 6:
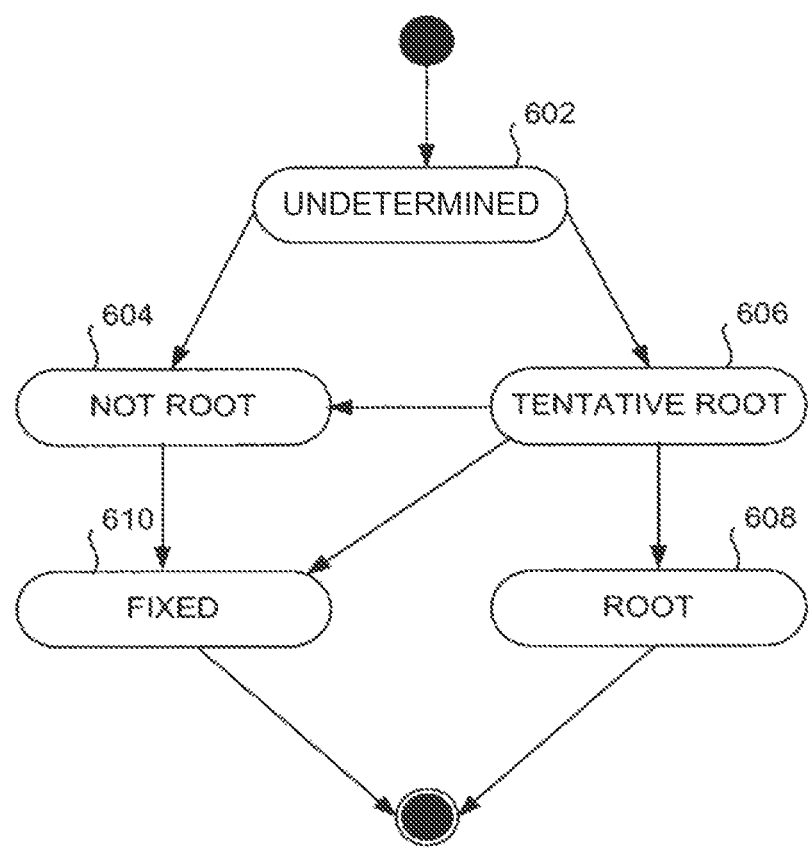
FIG. 6 illustrates an example state machine that may be implemented by each network device during the hierarchy discovery process.

FIG. 6 illustrates an example state machine that may be implemented by each network device during the hierarchy discovery process. More particularly, a network device starts out in the UNDETERMINED state 602. When a network device is in the UNDETERMINED state, the network device has not yet determined whether it is a child or a root node, nor has the network device established its parent or child node(s).

In order to communicate with the other network devices to establish the hierarchy, each of the network devices may broadcast advertisements (i.e., offers). As the network devices send and receive these advertisements, each network device may establish its place within the hierarchy. In accordance with one embodiment, each network device generates and broadcasts one or more hierarchy values, which may be randomly generated. For instance, the hierarchy values may be random numbers. The placement of the network devices within the hierarchy may be established by comparing the random numbers that have been broadcast by the network devices. For instance, the network device with the highest (or lowest) random number may be established as the master network device. In this manner, it is possible for a network device to identify itself as the master network device, and therefore the root node of the hierarchy. Similarly, upon receiving a better offer (e.g., a higher random number), a network device may ascertain that another network device is the master network device. This mechanism used to determine the master network device is resilient to device additions, deletions, and in-process device failures.

If the network device determines that it is not going to be the master network device, it establishes that it is not the root node and transitions to the NOT_ROOT state at 604. In order to make this determination, a network device may offer itself as the root node by advertising one or more hierarchy values such as one or more random numbers and wait for a network device to advertise or otherwise reply with a better root offer (e.g., by replying with or advertising a higher number). During this period of time in which advertisements/replies are transmitted, the network device is in the TENTATIVE_ROOT state 606.

If a better offer is received (e.g., a higher number is advertised or transmitted in a reply by another network device), the network device enters the NOT_ROOT state at 604. The network device may continue to advertise its hierarchy value and waits for a parent to claim it as a child.

However, if no better offers are received (e.g., no higher number is advertised or transmitted in a reply by another network device), the network device enters the ROOT state at 608. The network device that has established itself as the root node may analyze advertisements that have been broadcast by other network devices. More particularly, the root node may identify (e.g, select) one or more child nodes using the random number(s) generated and broadcast by the other network devices. In accordance with one embodiment, by using and comparing random numbers, the network device may identify a specific position in the hierarchy in which a child node fits, thus facilitating a fast discovery process for child node attachment. For instance, the network device may compare the random number(s) broadcast by the other network devices with its own random number(s) to identify a specific network device as its child node, as well as identify the child node's position within the hierarchy. One method of using a hierarchy value to determine the specific position of a node in a hierarchy will be described in further detail below with reference to FIG. 8. Once the root node identifies one or more network devices as child candidate(s), it may negotiate with the child candidate(s) to be its child. Once a child is "attached" to a parent, it is in the FIXED state as shown at 610.

Each child node may perform a similar process as the hierarchy is generated in a top-down manner. More particularly, this process may be performed in a recursive manner. For instance, once the child nodes are attached to a parent, those child nodes may identify their corresponding child node(s) by analyzing advertisements in a similar manner. More particularly, a child node may identify (e.g, select) one or more child nodes using the random number(s) generated and broadcast by the other (e.g., remaining) network devices.

Once the hierarchy or portion thereof has been generated, the root node has successfully identified one or more child nodes to which one or more of the files associated with the upgrade are to be distributed. The root node may then distribute the file(s) it has received or retrieved to the identified child node(s). Each of these child nodes may further distribute the file(s) to their child node(s), if present. Therefore, the pertinent file(s) may be distributed in parallel with the generation of the hierarchy. In this manner, the distributed downloading of one or more files throughout the entire hierarchy of network devices may be accomplished.

In accordance with one embodiment, a network device may serve as the master network device and therefore the root node for only a subset of the set of files to be distributed in association with the upgrade. For instance, the master network device may be responsible for distributing a single file. Thus, a different hierarchy may be generated for purposes of initiating a distributed download of another subset of files. As a result, it is possible that a different network device may serve as the master network device and root node for each different file or subset of files associated with the upgrade.

Figure 7:
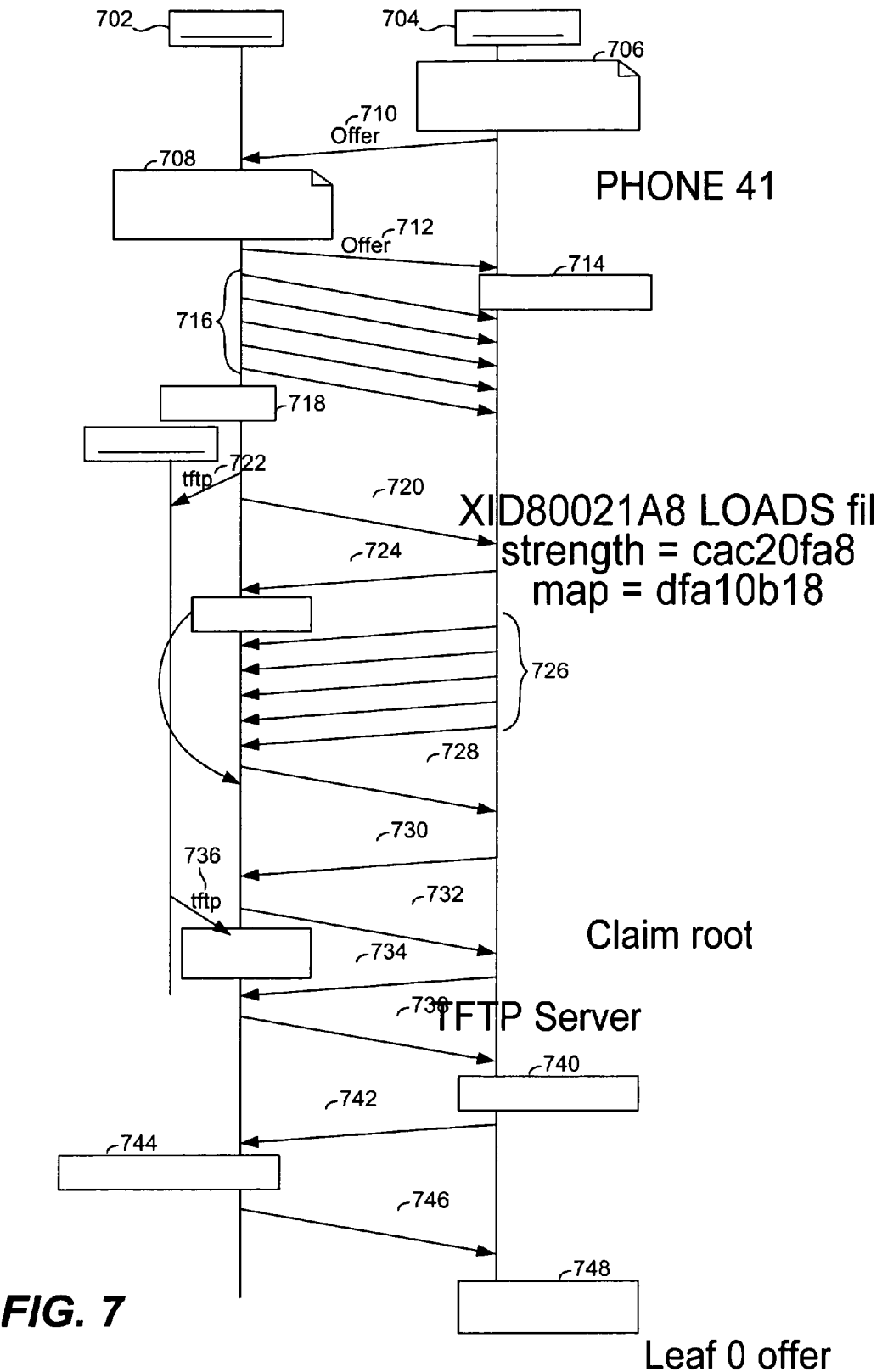
FIG. 7 is a transaction flow diagram illustrating an example of messages that may be transmitted between two different network devices being reset at approximately the same time.

FIG. 7 is a transaction flow diagram illustrating examples of messages that may be transmitted between two different network devices being reset at approximately the same time. Vertical line 702 represents a first network device, PHONE 41 and vertical line 704 represents a second network device, PHONE 37. As set forth above, upon receiving a reset, each of the phones may obtain the index (i.e., LOADS) file, which may identify one or more files to download. Once PHONE 37 receives a reset, it may retrieve the LOADS file at 706. Similarly, upon receiving a reset, PHONE 41 may retrieve the LOADS file at 708.

In order to generate a hierarchy, each of the network devices may advertise one or more hierarchy values (e.g., random numbers). This may be accomplished by sending an offer by broadcasting the random number(s) in an offer message to the network devices in the network. In this example, PHONE 37 sends its offer at 710 and PHONE 41 sends its offer at 712.

In accordance with one embodiment, the hierarchy values are two random numbers, which include a strength value and a map value. In this example, the network devices compare their strength values. More particularly, upon determining that PHONE 41 has advertised a higher strength value, PHONE 37 ascertains that it is not the root node and enters the NOT_ROOT state at 714. Upon determining that it has generated the highest strength value, PHONE 41 ascertains that it is the root node. PHONE 41 may then generate and broadcast one or more CLAIMROOT messages as shown at 716 in order to notify the other phones that it is claiming status as the root node. These CLAIMROOT messages may include the hierarchy value(s) of the network device transmitting the messages. In accordance with one embodiment, the network device sends five different messages consecutively after a pre-determined delay period (e.g., 0.5 seconds), as shown in this example. In this example, the delay is used to allow phones other than PHONE 37 and PHONE 41 to join in the hierarchy. However, in this example, no other advertisements are received, and therefore only two phones are involved.

Assuming that PHONE 41 does not receive a reply to the CLAIMROOT message(s), PHONE 41 claims its status as root node at 718. PHONE 41 may send an advertisement indicating that it is now the root node at 702, which may be performed after beginning the actual file transfer or prior to performing the file transfer. PHONE 41, as the root node for the hierarchy, may retrieve the file(s) for which it is responsible at 722. For instance, the root node may send a GETFILE message to a file server such as a Trivial File Transfer Protocol (TFTP) server. Alternatively, the network device may perform other methods for retrieving a file.

Each network device that is not the root node may advertise its status as a non-root node by sending a NOTROOT advertisement 724. In addition, each of the network devices that are not root nodes may also send an advertisement indicating its availability as a child (i.e., leaf) node as shown at 726. In accordance with one embodiment, each of the network devices that are not root nodes send five different messages consecutively after a pre-determined delay period, as shown in this example. Of course, this example is merely illustrative, and other mechanisms for sending advertisements are possible.

A parent node may select or identify one or more child nodes by comparing the hierarchy value(s) (e.g., random number(s)) that have been advertised by the other network devices to be upgraded. For instance, in this example, the parent node compares the map values that have been advertised by the other network devices. The parent node may then select or identify one or more network devices as its child node(s) according to the map values that have been advertised. In accordance with one embodiment, the parent node may uniquely identify one or more child nodes whose map values "match" its own map value, and therefore may identify the placement of the child nodes in the hierarchy using these map values, as will be described in further detail below with reference to FIG. 8. The parent node, PHONE 41, may send a message at 728 indicating that it would like PHONE 37 to be its child node. For instance, the message SETNODE Leaf 0 may indicate that the sending node would like the receiving node to be its leaf node. Such a message may identify the root or parent node by identifying a source IP address. The child node, PHONE 37, may then respond indicating that it accepts its status as child node to the requesting node at 730 by sending a SETNODEACK message.

The parent node, PHONE 41, may send a keep alive message in the form of a SETNODE State=1 message at 732. The SETNODE State=1 message may indicate that the root node has not yet retrieved the file(s). The child node, PHONE 37, may send a SETNODEACK message in response at 734 acknowledging the SETNODE State=1 message.

Once the file transfer to the root node is complete, the file server may notify the root node at 736. For instance, a TFTP server may send a XFER_COMPLETE message indicating to the root node that the file transfer is complete. The parent node, PHONE 41, may then send a SETNODE State=2 message at 738 to its child node, PHONE 37, indicating that it has the file(s) and is ready to send the file(s) to the child node. When the child node, PHONE 37, is notified that the parent is ready to perform the file transfer at 740, the child node may respond at 742 with a SETNODEACK message with the state=1 indicating that it is ready to receive the file(s). When the parent node receives notification that the child node is ready to receive the file(s) at 744, it may perform the file transfer at 746. Upon successfully receiving the file(s), the child may notify the parent at 748.

A parent node may also identify or select other child nodes. Thus, steps 728-734 and 738-748 may be performed to transfer the file(s) to one or more additional child nodes. These processes may be performed sequentially or in parallel to one another.

In order to generate the remainder of the hierarchy and transfer the file(s) to the other nodes in the hierarchy, each child node may act as a parent node. More particularly, each child node may claim one or more child nodes and perform a file transfer, as set forth above. More particularly, this may be accomplished by performing steps 728-734 and 738-748, as represented by the example illustrated in FIGS. 5A through 5E.

Figure 8:
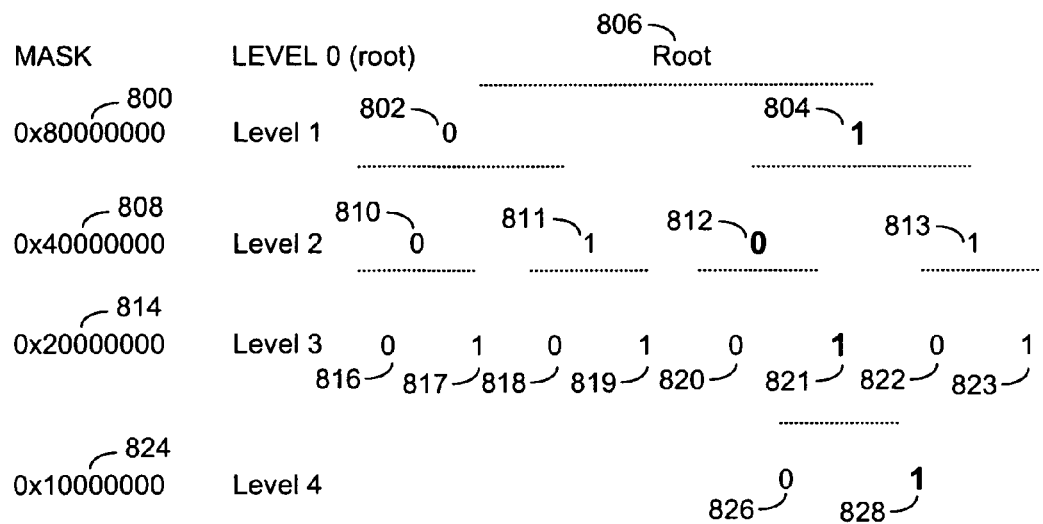
FIG. 8 is a diagram illustrating an example of the use of a hierarchy value to determine the position of a child node in a hierarchy.

FIG. 8 is a diagram illustrating an example of the use of a hierarchy value to determine the position of a child node in a hierarchy. In this example, the hierarchy includes a root node at level 0, and four additional levels. Since the hierarchy in this example is in the form of a binary tree, each node may have up to two different child nodes (i.e., leaf nodes). At each level, each of the available child node slots is denoted by "0" or "1."

In accordance with one embodiment, the network devices fill the hierarchy from the top down. As a result, there is no leaf contention or possibility of one node offering the same child node position to two different children. All child node positions at a given level need not be filled. Moreover, some branches of the tree may have more levels than others.

A hierarchy value (e.g., random number) that is advertised by a network device may be used to ascertain the position of the network device within the hierarchy. More particularly, a map value that has been advertised by the network device may function as a transfer map of inherent position(s) the network device can assume in the hierarchy. For instance, the transfer map may indicate the position the network device could occupy at each level of the hierarchy, although the level the network device will actually occupy is not yet known at the beginning of the process.

In accordance with one embodiment, the map value includes a different byte corresponding to each level of the hierarchy. In this example, the hierarchy includes four levels, and therefore the map value includes four different bytes. Each byte indicates the position that the network device would occupy (e.g., position 0 or position 1) at that level of the hierarchy.

As shown in this example, the most significant byte (0x80000000) 800 of the map value defines whether the network device would occupy leaf 0 802 or leaf 1 804 of level 1, immediately below the root node 806. The second most significant byte (0x40000000) 808 of the map value defines whether the network device would occupy leaf 0 or leaf 1 as a level 2 node depending on its parent node 802 or 804, as indicated by positions 810-113. The third most significant byte (0x20000000) 814 of the map value defines whether the network device would occupy leaf 0 or leaf 1 of level 3 as shown at 816-823 depending on the parent node, which would be item 810, 811, 812, or 813. The fourth most significant byte (0x010000000) 824 similarly indicates whether the network device would occupy leaf 0 or leaf 1 of level 4, depending on the parent node. In this example, only leaf 0 and leaf 1 positions of parent 821 are shown, denoted 826 and 828, respectively.

In the simple hierarchy shown, a network device that generated a random map value that began with 0xB (1011b) could occupy any of the positions in the hierarchy shown in bold, shown as leaf 1 804, leaf 0 812, leaf 1 821, and leaf 1 from 828. In accordance with one embodiment, when a network device advertises its hierarchy value(s), the network device compares the map value it has advertised with the map value(s) it has received from other network device(s). More particularly, the network device compares the byte of the map values corresponding to a particular level. If there is a match, the network device has successfully identified a parent to child relationship at the position of the level of the hierarchy indicated by the matching bytes. The network device may then generate a link to the child node and/or notify the child node accordingly. In this manner, it is possible to quickly and unambiguously determine placement of child nodes within the hierarchy.

Various network devices may be configured or adapted for performing the disclosed functionality. These network devices include network devices being upgraded with a set of files, which include, but are not limited to, IP phones. Moreover, the functionality for the disclosed processes may be implemented in software as well as hardware.

Yet another embodiment of the invention pertains to computer program products including machine-readable media on which are provided program instructions for implementing the methods and techniques described herein, in whole or in part. Any of the methods described herein may be represented, in whole or in part, as program instructions that can be provided on such machine-readable media. In addition, another embodiment of the invention pertains to various combinations and arrangements of data generated and/or used as described herein. For example, structures having the format described herein and provided on appropriate media are part of this disclosure. Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. For instance, the above-described messages are merely illustrative and therefore the disclosed embodiments may be performed in an alternate manner. Thus, broadly speaking, the disclosed embodiments need not be performed using the steps described above. In other words, the disclosed techniques may be performed in an alternate manner, as well as be implemented using other mechanisms and data structures. Moreover, the disclosed embodiments may be implemented in software, hardware, or any combination of hardware and software.

In addition, the disclosed embodiments would apply regardless of the context and system in which it is implemented. More particularly, the above-described embodiments may be implemented in a variety of network devices. For instance, the disclosed embodiments may be implemented with other network devices such as those capable of receiving, transmitting, and/or processing voice or data signals. As one example, such a network device may be a network device capable of operating according to a Voice over IP protocol. Voice over IP (VoIP) refers to technology that enables routing of voice conversations over the Internet or any other IP network. In addition, the steps represented in the example processes are merely illustrative, and therefore the steps may be performed in a different manner or a different order. Accordingly, the present embodiments are to be considered as illustrative and not restrictive, and the disclosed embodiments are not to be limited to the details given herein, but may be modified within the scope and equivalents of the appended claims.

The invention claimed is:

1. A method comprising:
dynamically generating a hierarchy value by a network device in a set of network devices and broadcasting the hierarchy value to other network devices in the set of network devices, wherein the hierarchy value is a randomly generated numerical value;
receiving hierarchy values that have been dynamically generated by the other network devices in the set of network devices and broadcast by the other network devices in the set of network devices, wherein the hierarchy values are randomly generated numerical values;
identifying by the network device in the set of network devices its status as a master network device in the set of network devices by comparing the hierarchy value that is dynamically generated by the network device with the hierarchy values that have been dynamically generated by and received from the other network devices in the set of network devices, wherein the master network device is responsible for initiating distributed downloading of or more files in a set of files, wherein the master network device serves as a master network device only for the one or more files to be distributed by the master network device, wherein a different one of the set of network devices is configured to serve as a master network device for a different file in the set of files, and wherein the hierarchy values that have been dynamically generated by the other network devices in the set of network devices have been broadcast by and received from the other network devices in the set of network devices;
retrieving or receiving the one or more files in the set of files by the master network device;
receiving by the network device an index file identifying the set of files, wherein the index file indicates an order in which the set of files is to be retrieved and distributed among the set of network devices; and
automatically distributing the one or more files by the master network device to a subset of the set of network devices without receiving a request from the subset of the set of network devices, the subset of the network devices including one or more network devices in the set of network devices, wherein the one or more files are configured to be distributed in a hierarchical manner to remaining network devices in the set of network devices via the subset of the set of network devices.

2. The method as recited in claim 1, wherein each of the set of network devices is an Internet Protocol (IP) phone.

3. The method as recited in claim 1, further comprising:
identifying by the network device one or more child nodes to which the one or more files are to be distributed, wherein each of the child nodes is a network device in the set of network devices;
wherein distributing is performed by distributing the one or more files to the identified child nodes.

4. The method as recited in claim 3, wherein identifying the one or more child nodes is performed by comparing the hierarchy value that has been dynamically generated by the network device with a hierarchy value that has been dynamically generated and broadcast by at least a portion of the other network devices in the set of network devices.

5. The method as recited in claim 3, wherein the identified child nodes are responsible for distributing the one or more files to their respective child nodes, wherein the respective child nodes are identified based upon the hierarchy values that have been dynamically generated and broadcast by the set of network devices.

6. The method as recited in claim 3, wherein the one or more child nodes are dynamically selected by the master network device based upon the dynamically generated hierarchy value generated by the network device and the hierarchy values dynamically generated by and received from the other network devices in the set of network devices.

7. The method as recited in claim 1, further comprising:
sending by the master network device a message to the other network devices in the set of network devices, the message indicating that the network device is the master network device.

8. The method as recited in claim 1, the master network device does not distribute the one or more files to all remaining network devices in the set of network devices.

9. The method as recited in claim 1, wherein a different one of the set of network devices serves as the master network device for a different file in the set of files based upon a different dynamically generated hierarchy value generated and broadcast by the network device and each other network device in the set of network devices.

10. The method as recited in claim 1, wherein identifying by a network device in the set of network devices its status as a master network device in the set of network devices comprises:
communicating by the network device with the other network devices in the set of network devices to arrange the set of network devices in a hierarchy for purposes of downloading the one or more files in the set of files based upon the hierarchy value that has been dynamically generated by the network device and the hierarchy values that have been dynamically generated by the other network device in the set of network devices.

11. The method as recited in claim 1, further comprising:
receiving a message from each of the one or more network devices in the set of network devices, the message indicating that the corresponding one of the one or more network devices is
available as a child node, wherein the message includes a corresponding dynamically generated hierarchy value.

12. The method as recited in claim 1, wherein the set of network devices are dynamically arranged in a hierarchy for purposes of downloading the one or more files based upon the dynamically generated hierarchy value generated by the network device and the hierarchy values dynamically generated by and received from each of the other network devices in the set of network devices.

13. The method as recited in claim 1, wherein the set of network devices dynamically arrange themselves in a hierarchy for purposes of downloading the one or more files based upon the dynamically generated hierarchy value generated by the network device and the hierarchy values dynamically generated by and received from the other network devices in the set of network devices.

14. The method as recited in claim 13, wherein the set of network devices dynamically arrange themselves in a different hierarchy for purposes of downloading another one of the set of files based upon the dynamically generated hierarchy value generated by the network device and the hierarchy values that have been dynamically generated by and received from the other network devices in the set of network devices.

15. The method as recited in claim 1, further comprising:
negotiating by the master network device with the one or more network devices in the set of network devices such that the one or more network devices are child nodes of the master network device to which the master network device is to distribute the one or more files.

16. The method as recited in claim 1, wherein the master network device is a root node in a hierarchy dynamically formed by the set of network devices according to the dynamically generated hierarchy value generated by the network device and the hierarchy values that have been dynamically generated by and received from the other network devices in the set of network devices.

17. The method as recited in claim 16, wherein the hierarchy is dynamically formed via communications among the set of network devices.

18. The method as recited in claim 17, wherein the communications include the dynamically generated hierarchy value generated by the network device and the hierarchy values that have been dynamically generated by and received from the other network devices in the set of network devices.

19. The method as recited in claim 1, wherein the one or more files are distributed in a hierarchical manner to remaining network devices in the set of network devices via the subset of the set of network devices.

20. The method as recited in claim 1, wherein the set of files are associated with an upgrade to be performed on the set of network devices.

21. The method as recited in claim 1, wherein the network device and the other network devices in the set of network devices dynamically generate and broadcast new hierarchy values in order to enable one of the set of network devices to serve as a master device for a different file in the set of files.

22. The method as recited in claim 1, wherein the network device and the other network devices in the set of network devices dynamically generate and broadcast new hierarchy values in order to enable one of the set of network devices to serve as a master device for a different file in the set of files after the one or more files have been distributed by the network device.

23. The method as recited in claim 1, wherein the hierarchy values that have been dynamically generated and broadcast by the network device and the other network devices in the set of network devices are only valid for the distribution of the one or more files.

24. The method as recited in claim 1, wherein the master device identifies the subset of the set of network devices based upon the hierarchy values that have been dynamically generated and broadcast by the other network devices in the set of network devices and the hierarchy value that has been dynamically generated by the network device.

25. The method as recited in claim 1, wherein a different one of the set of network devices is identified as a master network device for purposes of distributing a different one or more files in the set of files.

26. The method as recited in claim 1, wherein the hierarchy value and the hierarchy values are generated for the purpose of generating a hierarchical relationship among the set of network devices.

27. The method as recited in claim 26, wherein the hierarchical relationship is generated for the purpose of distributing the one or more files in the set of files.

28. The method as recited in claim 27, a different hierarchy value and different hierarchy values are generated for the purpose of distributing a different file in the set of files.

29. An apparatus, comprising:
a processor; and
a memory, at least one of the processor or the memory being adapted for:
dynamically generating a hierarchy value, wherein the apparatus is a network device in a set of network devices, wherein the hierarchy value is a randomly generated numerical value;
broadcasting the hierarchy value to other network devices in the set of network devices;
receiving hierarchy values that have been dynamically generated by the other network devices in the set of network devices and broadcast by the other network devices in the set of network devices, wherein the hierarchy values are randomly generated numerical values;
identifying by the apparatus its status as a master network device in the set of network devices based upon a comparison of the hierarchy value that is dynamically generated by the apparatus with the hierarchy values that have been dynamically generated by and received from the other network devices in the set of network devices, wherein the master network device is responsible for initiating distributed downloading of one or more files in a set of files, wherein the master network device serves as a master network device only for the one or more files to be distributed by the master network device, wherein a different one of the set of network devices is configured to serve as a master network device for a different file in the set of files, and wherein the hierarchy values that have been dynamically generated by the other network devices in the set of network devices have been broadcast by and received from the other network devices in the set of network devices;

retrieving or receiving the one or more files in the set of files by the master network device;

receiving by the apparatus an index file identifying the set of files, wherein the index file indicates an order in which the set of files is to be retrieved and distributed among the set of network devices;

identifying a subset of the set of network devices to which the apparatus is to distribute the one or more files, wherein the subset of the set of network devices to which the apparatus is to distribute the one or more files are identified based upon the comparison, the subset of the network devices including one or more network devices in the set of network devices; and automatically distributing the one or more files by the master network device to the subset of the set of network devices, wherein the one or more files are configured to be distributed in a hierarchical manner to remaining network devices in the set of network devices via the subset of the set of network devices.

30. The apparatus as recited in claim 29, wherein each of the set of network devices is an Internet Protocol (IP) phone.

31. The apparatus as recited in claim 29, at least one of the processor or the memory being further adapted for:

identifying by the apparatus one or more child nodes to which the one or more files are to be distributed, wherein each of the child nodes is a network device in the set of network devices;

wherein distributing is performed by distributing the one or more files to the identified child nodes;

wherein identifying the one or more child nodes is performed based upon the hierarchy values that have been dynamically generated by the apparatus and the other network devices in the set of network devices.

32. The apparatus as recited in claim 29, wherein the master network device serves as a master network device only for the one or more files to be distributed by the master network device, wherein a different one of the set of network devices is configured to serve as a master network device for a different file in the set of files based upon new hierarchy values that are dynamically generated by the apparatus and the other network devices in the set of network devices.

33. A non-transitory computer-readable medium storing instructions which, when executed by a processor, cause the processor to perform operations comprising:

dynamically generating a hierarchy value by a network device in a set of network devices and broadcasting the hierarchy value to other network devices in the set of network devices, wherein the hierarchy value is a randomly generated numerical value;

receiving hierarchy values that have been dynamically generated by the other network devices in the set of network devices and broadcast from the other network devices in the set of network devices, wherein the hierarchy values are randomly generated numerical values;

identifying by the network device in the set of network devices its status as a master network device in a set of network devices according to a comparison of the hierarchy value that is dynamically generated by the network device with the hierarchy values that have been dynamically generated by the other network devices in the set of network devices, wherein the master network device is responsible for initiating distributed downloading of one or more files in a set of files, wherein the master network device serves as a master network device only for the one or more files to be distributed by the master network device, wherein a different one of the set of network devices is configured to serve as a master network device for a different file in the set of files, and wherein the hierarchy values that have been dynamically generated by the other network devices in the set of network devices have been broadcast by and received from the other network devices in the set of network devices;

retrieving or receiving the one or more files in the set of files by the master network device;

receiving by the network device an index file identifying the set of files, wherein the index file indicates an order in which the set of files is to be retrieved and distributed among the set of network devices; and automatically distributing the one or more files by the master network device to a subset of the set of network devices, the subset of the network devices including one or more network devices in the set of network devices, wherein the one or more files are configured to be distributed in a hierarchical manner to remaining network devices in the set of network devices via the subset of the set of network devices.

* * * * *